US009036044B1

(12) United States Patent
Bae et al.

(10) Patent No.: US 9,036,044 B1
(45) Date of Patent: May 19, 2015

(54) ADJUSTING CAMERA PARAMETERS ASSOCIATED WITH A PLURALITY OF IMAGES

(71) Applicant: Google Inc., Mountain View, CA (US)

(72) Inventors: Soohyun Bae, Palo Alto, CA (US); William James Rucklidge, Mountain View, CA (US)

(73) Assignee: Google Inc., Mountain View, CA (US)

( * ) Notice: Subject to any disclaimer, the term of this patent is extended or adjusted under 35 U.S.C. 154(b) by 80 days.

(21) Appl. No.: 13/947,159

(22) Filed: Jul. 22, 2013

(51) Int. Cl.
*H04N 5/228* (2006.01)
*H04N 5/232* (2006.01)
*H04N 5/225* (2006.01)

(52) U.S. Cl.
CPC ................................. *H04N 5/23216* (2013.01)

(58) Field of Classification Search
USPC .......................................... 348/207.99, 222.1
See application file for complete search history.

(56) References Cited

U.S. PATENT DOCUMENTS

| | | | | |
|---|---|---|---|---|
| 6,249,616 B1 * | 6/2001 | Hashimoto | .................... | 382/284 |
| 6,563,950 B1 * | 5/2003 | Wiskott et al. | ................. | 382/209 |
| 7,113,641 B1 * | 9/2006 | Eckes et al. | .................... | 382/218 |
| 7,672,482 B2 * | 3/2010 | Bolin et al. | .................... | 382/103 |
| 7,751,599 B2 * | 7/2010 | Chen et al. | .................... | 382/118 |
| 7,756,325 B2 * | 7/2010 | Vetter et al. | ................... | 382/154 |
| 8,260,006 B1 | 9/2012 | Callari et al. | | |
| 8,442,307 B1 | 5/2013 | Anati et al. | | |
| 8,576,235 B1 * | 11/2013 | Sumner et al. | ................ | 345/474 |
| 8,866,845 B2 * | 10/2014 | Leung et al. | ................... | 345/633 |
| 2007/0253618 A1 * | 11/2007 | Kim et al. | ...................... | 382/154 |
| 2012/0300020 A1 * | 11/2012 | Arth et al. | ......................... | 348/36 |
| 2012/0300979 A1 * | 11/2012 | Pirchheim et al. | ............ | 382/103 |
| 2012/0306847 A1 * | 12/2012 | Lim et al. | ....................... | 345/418 |
| 2013/0121558 A1 | 5/2013 | Jin et al. | | |
| 2014/0270480 A1 * | 9/2014 | Boardman et al. | ............ | 382/154 |

OTHER PUBLICATIONS

Triggs et al., "Bundle Adjustment—A Modern Synthesis", Vision Algorithms: Theory and Practice, vol. 1883, 2000, pp. 298-375.

* cited by examiner

*Primary Examiner* — Ngoc-Yen Vu
(74) *Attorney, Agent, or Firm* — Dority & Manning, P.A.

(57) ABSTRACT

Systems and methods for adjusting a camera parameter associated with a plurality of two-dimensional images are provided. Matched features can be selected as constraints for bundle adjustment using a graph model constructed based on the matched features. The graph model can have a plurality of nodes including a source node, a sink node, a point node for every matched feature, and a pose pair node associated with each pose pair viewing a matched feature. The graph model can include a plurality of edges interconnecting the plurality of nodes in the graph model. Each of these edges can be assigned a capacity and a cost based on various parameters. A flow can be computed through each of the edges of the graph model using, for instance, a minimum-cost maximum-flow algorithm. Matched features can be selected for bundle adjustment based on the flows of the edges in the graph model.

17 Claims, 6 Drawing Sheets

ADJUSTING CAMERA PARAMETERS ASSOCIATED WITH A PLURALITY OF IMAGES

FIELD

The present disclosure relates generally to image processing and more particularly to selection of points for bundle adjustment of camera parameters associated with a plurality of images.

BACKGROUND

Bundle adjustment is a process of identifying the three-dimensional coordinates of points depicted in a set of images in addition to camera parameters associated with the camera(s) used to capture the set of images. For instance, bundle adjustment can be used to identify and/or refine extrinsic camera parameters, such as position and orientation of the camera used to capture an image (i.e. the pose of the image). Bundle adjustment can also be used to identify and/or refine intrinsic camera parameters, such as principal point, focal length, lens distortion, skewness, etc. The camera parameter information can be used, for instance, in many image visualization and manipulation products. For instance, geographic information systems can use this information to geolocate objects depicted in imagery and to generate, render, and refine three-dimensional models of a geographic area.

The process of bundle adjustment typically seeks consistency in the connectivity among a set of two-dimensional images taken of a scene. The images are captured from camera(s) in poses known to some degree of accuracy. Intrinsic camera parameters can also be known to some degree of accuracy. For instance, each image can have its own pose but all or a part of images from the same camera may share a single set of intrinsic camera parameters. Bundle adjustment uses the fact that the set of images reflect some self-consistent world to improve the precision of the camera poses and intrinsic camera parameters. Bundle adjustment can suffer drawbacks when matched features are unbalanced among the set of images. In addition, the use of an excessive number of matched features for bundle adjustment can significantly increase the computational expense of the bundle adjustment process.

SUMMARY

Aspects and advantages of the invention will be set forth in part in the following description, or may be obvious from the description, or may be learned through practice of the invention.

One exemplary aspect of the present disclosure is directed to a computer-implemented method for adjusting a camera parameter associated with a plurality of images. The method includes identifying, with a computing device, a matched feature in the plurality of images. The matched feature is associated with at least one pose pair. The at least one pose pair includes two images of the plurality of images that depict the matched feature. The method further includes constructing, with the computing device, a graph model based at least in part on the matched feature. The graph model includes a plurality of nodes, including a source node and a sink node. The graph model further includes a plurality of edges. The method further includes computing, with the computing device, a flow through the plurality of edges in the graph model and selecting, with the computing device, the matched feature as a constraint for adjusting the camera parameter based at least in part on the flow computed through the plurality of edges in the graph model.

Other exemplary aspects of the present disclosure are directed to systems, apparatus, tangible, non-transitory computer-readable media, user interfaces and devices for adjusting a camera parameter associated with a plurality of images.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Figure 1:
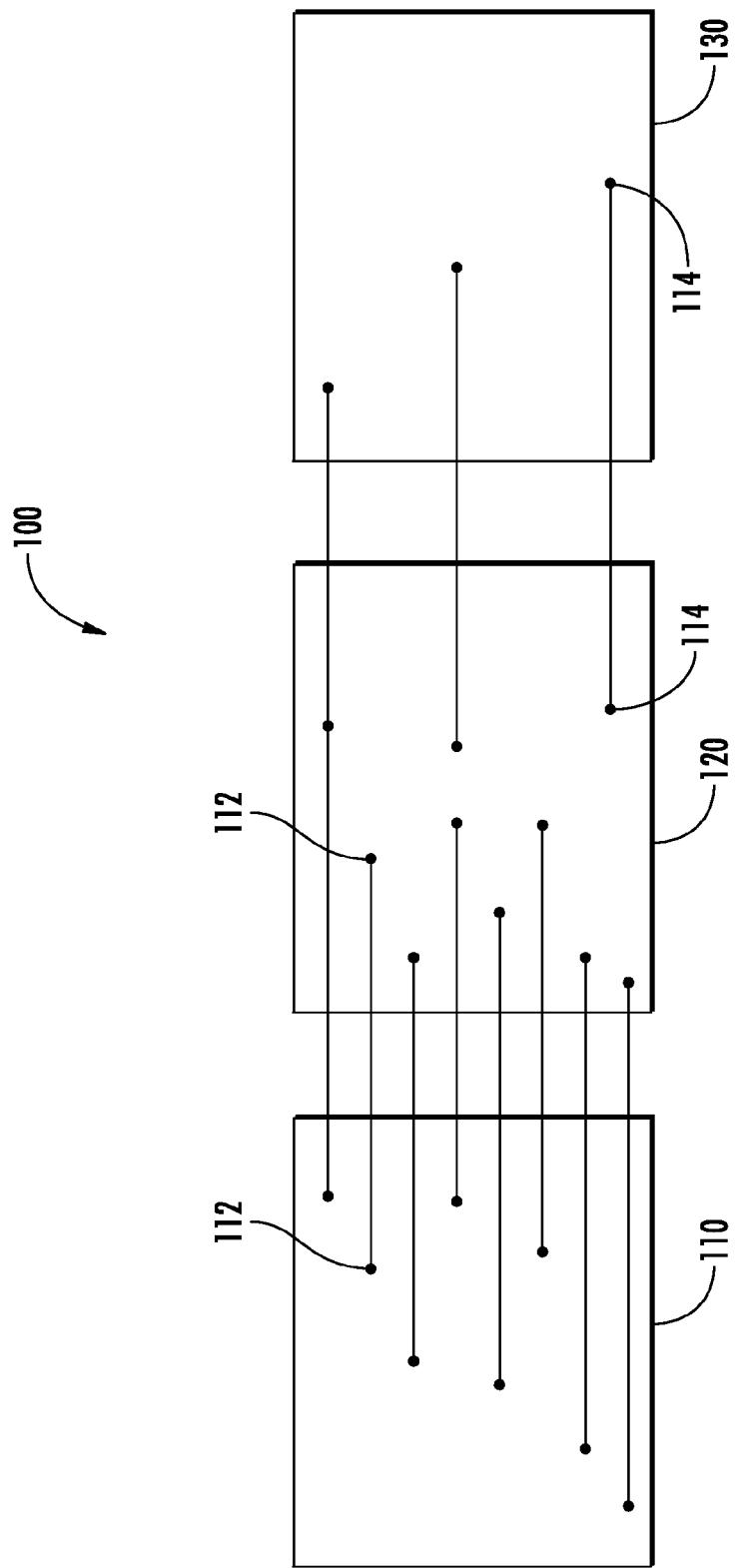
FIG. 1 depicts exemplary matched features between two-dimensional images.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Overview

Generally, the present disclosure is directed to selecting points for bundle adjustment of camera parameters. Bundle adjustment can be used to seek consistency among a set of two-dimensional images (e.g. photographs) taken of a scene, such as a geographic area. Accurate camera parameters (e.g. pose and intrinsic camera parameter(s)) can be essential for many applications, including construction of three-dimensional models, geolocating data, stitching images, estimating depth, and localizing images. Aspects of the present disclosure are directed to selecting matched features depicted in the two-dimensional images for use in the bundle adjustment process. The selection of matched features according to aspects of the present disclosure can have a technical effect of improving the balance and efficiency of the bundle adjustment process.

Bundle adjustment typically includes three steps: (1) feature detection; (2) feature matching; and (3) parameter optimization. Feature detection searches each image for locations that are distinctive. Feature matching compares the sets of features in the images to determine groups of features that correspond to a fixed point represented in the images. These matched features are set as constraints for the parameter optimization. Parameter optimization uses, for instance, non-linear optimization to find adjustments to the camera poses and intrinsic camera parameters that satisfy (as far as possible) the constraints given by the feature matches.

Problems can arise in bundle adjustment when matched features are unbalanced between images. For example, FIG. 1 depicts a set of two-dimensional images 100 captured of a scene, such as a geographic area. The set of two-dimensional images 100 can include a first image 110, a second image 120, and a third image 130. Bundle adjustment seeks consistency in the connectivity among the set of two-dimensional images 100. As shown, there are many matched features 112 tying the first image 110 to the second image 120. However, there are relatively few matched features 114 tying the third image 130 to the second image 120. For purposes of simplicity of illustration and discussion, matched features are described as being two-way matches between two images. Those of ordinary skill in the art, using the disclosures provided herein, will understand that the matched features can in fact be multi-way matches among a plurality of images.

The matched features for the set of images 100 are unbalanced. More particularly, there are more matched features 112 between the first image 110 and the second image 120 than matched features 114 between the second image 120 and the third image 130. Using all of the matched features 112 and 114 for the set of images 100 as constraints for bundle adjustment can result in the constraints associated with the matched features 112 overwhelming the constraints associated with the matched features 114. As a result, the bundle adjustment can favor a minor improvement in the correspondence between the first image 110 and second image 120 even if that minor improvement causes the correspondence between the second image 120 and the third image 130 to be greatly affected in a negative fashion.

According to aspects of the present disclosure, matched features are selected as constraints for bundle adjustment in a manner that eliminates the bulk of common constraints while preserving rare constraints. More particularly, a graph model can be constructed based on the set of matched features. The graph model can have a plurality of nodes including a source node, a sink node, a point node for every matched feature, and a pose pair node associated with each pose pair viewing a matched feature. The graph model can include a plurality of edges interconnecting the plurality of nodes in the graph model. Each of these edges can be assigned a capacity and a cost based on various parameters. The graph model can be constructed to favor selection of matched features viewed by more images from different cameras as constraints for parameter optimization. For instance, the edges can be assigned a capacity and cost based on the number of pose pairs viewing a matched feature and/or the number of images viewing a matched feature.

Once the graph model is constructed, a flow can be computed through each of the edges of the graph model using, for instance, a minimum-cost maximum-flow algorithm. Matched features can be selected for bundle adjustment based on the respective flows of the edges in the graph model. For instance, the flow (or ratio of flow to edge cost) of an edge associated with a matched feature can be compared to a threshold. The matched feature can be selected as a constraint for bundle adjustment when the flow (or ratio of flow to edge cost) of the edge exceeds a threshold.

In this manner, the number of potential matched features selected as constraints for bundle adjustment can be reduced while keeping the connectivity balance among poses and intrinsic camera parameters for the plurality of two-dimensional images. Balancing the connectivity among the poses and other camera parameters avoids suboptimal solutions during bundle adjustment. In addition, reducing the number of matched features selected as constraints reduces the number of variables used during parameter optimization, decreasing the computational expense of the bundle adjustment process.

Figure 2:
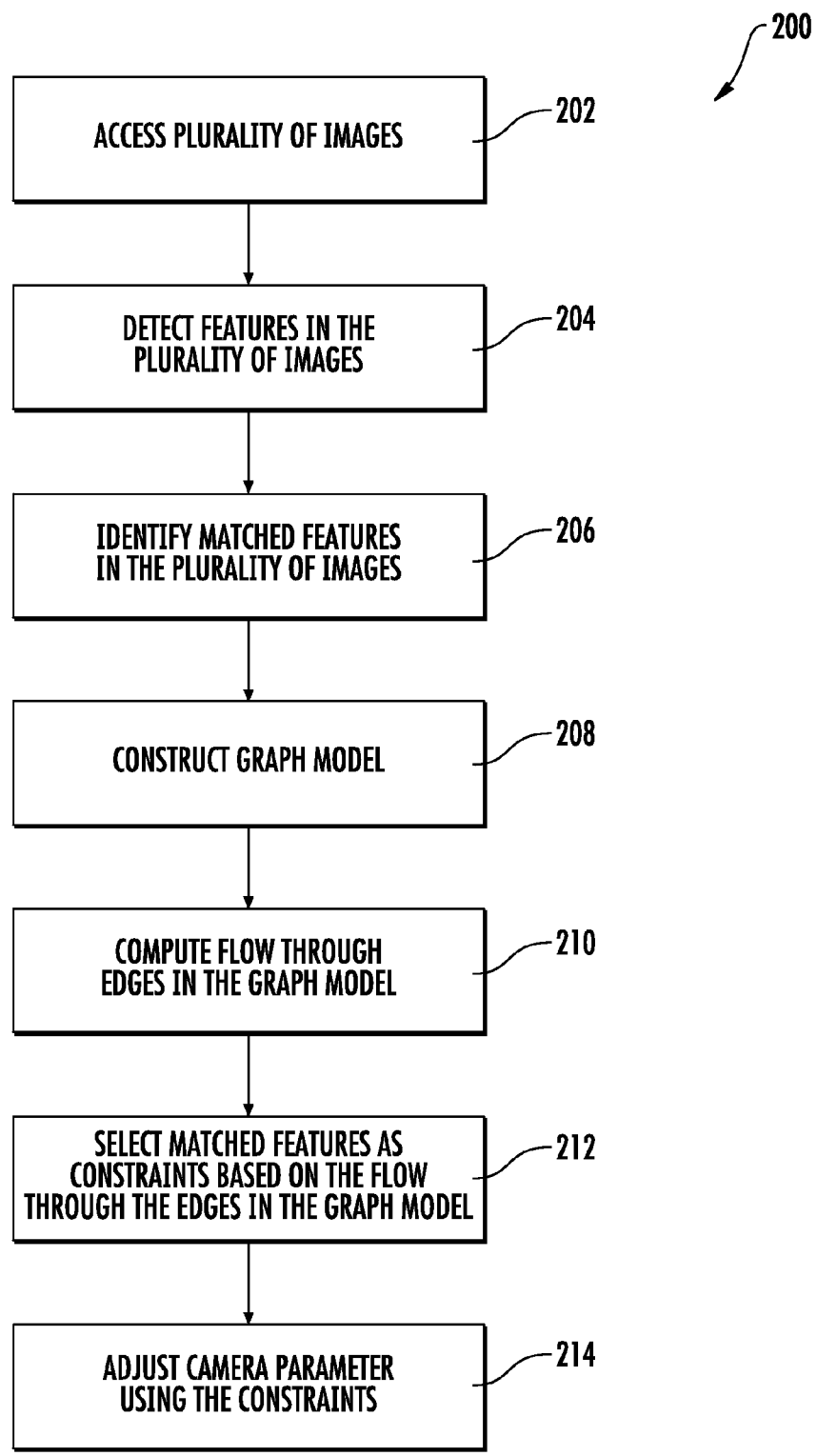
FIG. 2 depicts a flow diagram of an exemplary computer-implemented method of adjusting a camera parameter associated with a plurality of images according to an exemplary embodiment of the present disclosure

Flow Diagram of an Exemplary Method for Adjusting One or More Camera Parameters Associated with a Plurality of Images FIG. 2 depicts a flow diagram of an exemplary method (200) for adjusting one or more camera parameters using bundle adjustment according to an exemplary embodiment of the present disclosure. The method (200) can be implemented by any suitable computing device or system, such as the system 600 depicted in FIG. 6. In addition, the steps depicted in FIG. 2 are depicted as performed in a particular order for purposes of illustration and discussion. Those of ordinary skill in the art, using the disclosures provided herein, will understand that the steps of any of the methods discussed herein can be omitted, adapted, rearranged, or expanded in various ways without deviating from the scope of the present disclosure.

At (202), the method includes accessing a plurality of two-dimensional images. The two-dimensional images can be accessed, for instance, from a memory. The two-dimensional images can be digital images of a geographic area captured by a camera. For instance, the two-dimensional images can be aerial or satellite images of a geographic area. In addition or in the alternative, the two-dimensional images can be images of a geographic area captured from perspectives at or near the ground or street level.

The two-dimensional images can be used to provide interactive imagery of a geographic area to be rendered and presented to a user in a geographic information system. For instance, in one embodiment, the two-dimensional images can be used to construct a three-dimensional model of a geographic area. The two-dimensional images can also be used, for instance, to construct maps of the geographic area and/or can be stitched together to provide interactive panoramas of the geographic area.

The two-dimensional images can be associated with extrinsic and intrinsic camera parameters. Extrinsic camera parameters include the pose of the image. The pose of the image provides the position and orientation of the image relative to a reference. Each image can have its own associated pose information. Intrinsic camera parameters can include, for instance, principal point, focal length, lens distortion, skewness, and other attributes of the camera capturing the image. Images captured from the same camera during a similar time period may be associated with the same intrinsic camera parameters. Images captured from different cameras can be associated with different intrinsic camera parameters.

The extrinsic and intrinsic camera parameters for the images can be known to some degree of accuracy. For instance, the camera parameter information can be determined and recorded for the images as the images are captured. Alternatively, techniques such as structure-from-motion can be performed to determine initial poses of the plurality of images. Bundle adjustment can be used to adjust or refine the camera parameters for the plurality of images to achieve a consistency among the plurality of images.

Figure 3:
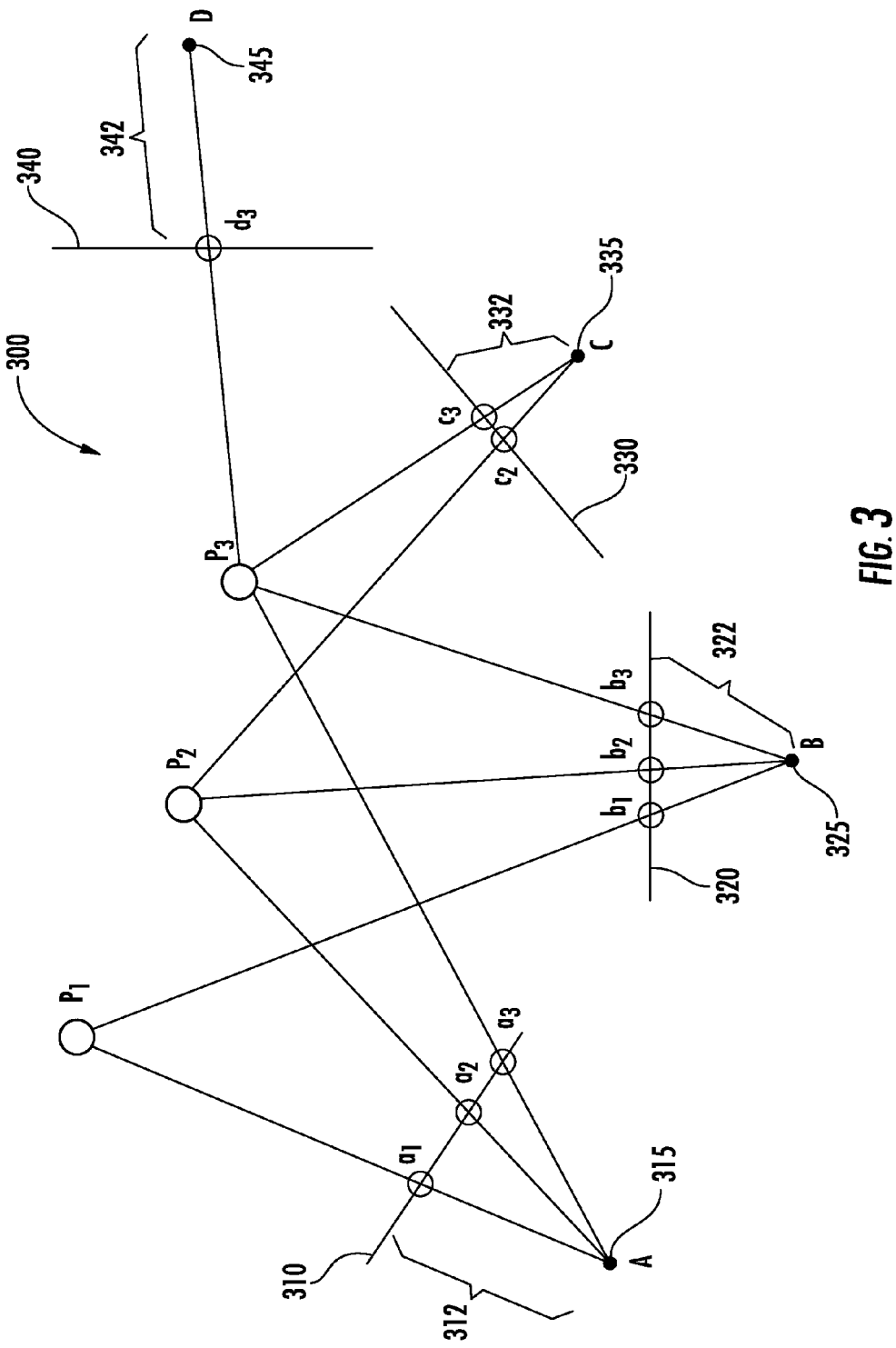
FIG. 3 depicts exemplary matched features for a plurality of images determined according to exemplary aspects of the present disclosure.

FIG. 3 depicts an exemplary set of a plurality of images 300 that can be accessed for bundle adjustment. The set of the plurality of images 300 can include a first image 310, a second image 320, a third image 330, and a fourth image 340. As shown, each image in the set of images 300 can be associated with its own unique pose relative to the scene. For instance, first image 310 can be associated with pose A. Second image 320 can be associated with pose B. Third image 330 can be associated with pose C. Fourth image 340 can be associated with pose D. For purposes of the present disclosure, each image can be referred to by its associated pose. For instance, images 310, 320, 330, and 340 can be referred to as pose A, pose B, pose C, and pose D respectively.

Each image in the set of images can also be associated with intrinsic camera parameters, such as principal point, focal length, lens distortion, skewness, etc. For instance, first image 310 can be associated with a focal length 312 and a principal point 315. Second image 320 can be associated with a focal length 322 and a principal point 325. Third image 330 can be associated with a focal length 332 and a principal point 335. Fourth image 340 can be associated with a focal length 342 and a principal point 345.

Referring back to FIG. 2 at (204), a plurality of features are detected in the plurality of images. Feature detection searches each image for locations that are distinctive. Any suitable technique can be used for feature detection. For example, image processing techniques can analyze image gradients to identify distinctive features in each of the plurality of images. Referring to the example of FIG. 3, features $a_1$, $a_2$, and $a_3$ can be identified and extracted from first image 310. Features $b_1$, $b_2$, and $b_3$ can be identified and extracted from second image 320. Features $c_2$ and $c_3$ can be identified and extracted from third image 330. Feature $d_3$ can be identified and extracted from fourth image 340.

Once the features in the plurality of images have been detected, the method can include identifying matched features between images in the set of images as shown at (206) of FIG. 2. Feature matching compares the detected features in the images to determine groups of features that correspond to some fixed point in the scene depicted by the captured images. The features can be matched, for instance, based on appearance or based on feature similarity. Other suitable techniques can be used to identify matched features without deviating from the scope of the present disclosure.

Referring to the example of FIG. 3, features $a_1$, $b_1$, and $c_1$ can be matched between first image 310, second image 320, and third image 330. The matched features $a_1$, $b_1$, and $c_1$ can correspond to point $P_1$ in the scene depicted by the plurality of images 300. Features $a_2$, $b_2$, and $c_2$ can be matched between first image 310, second image 320, and third image 330. The matched features $a_2$, $b_2$, and $c_2$ can correspond to point $P_2$ in the scene depicted by the plurality of images 300. Features $a_3$, $b_3$, $c_3$, and $d_3$ can be matched between first image 310, second image 320, third image 330, and fourth image 340. The matched features $a_3$, $b_3$, $c_3$, and $d_3$ can correspond to point $P_3$ in the scene depicted by the plurality of images 300. The matched features can be used as constraints for bundle adjustment. According to aspects of the present disclosure, a subset of the matched features can be selected to improve the balance and efficiency of the bundle adjustment.

Referring to FIG. 2 at (208) a graph model is constructed based on the matched features. More particularly, the graph model is constructed based at least in part on the matched features identified in the plurality of images. The graph model can be constructed to favor selection of matched features that are viewed by more images captured from different cameras. For example, the graph model can be constructed based on the number of poses (i.e. images) viewing each of the matched features and the number of pose pairs viewing each of the matched features. A pose pair is a set of two images that both view the matched feature.

Figure 4:
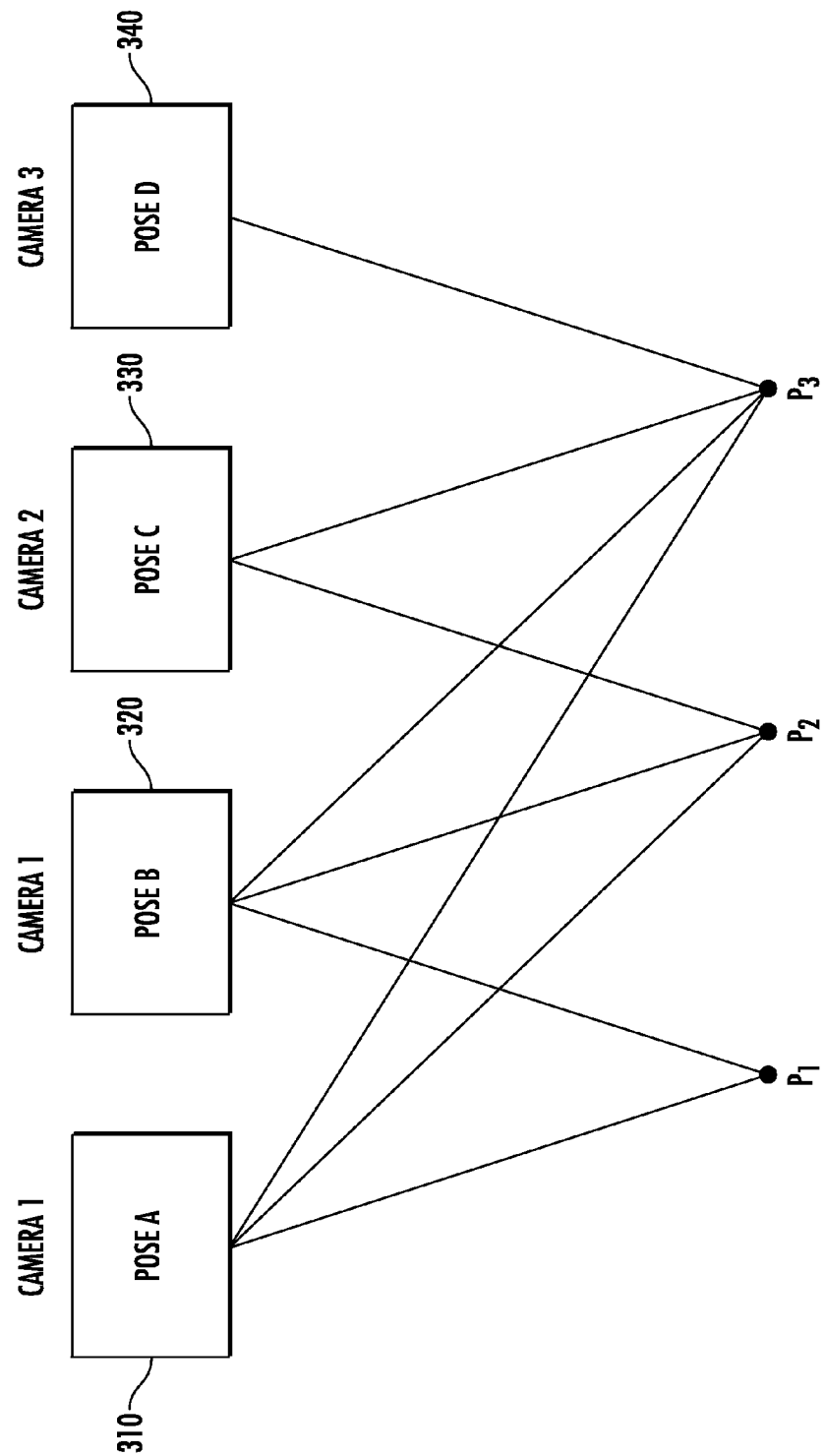
FIG. 4 depicts a simplified representation of images and pose pairs viewing the matched features of FIG. 3.

FIG. 4 provides a simplified graphical representation of the number of images and pose pairs viewing the matched features corresponding to points $P_1$, $P_2$ and $P_3$ of FIG. 3. As demonstrated in FIG. 4, the matched feature corresponding to point $P_1$ is viewed by two images including first image 310 (pose A) and second image 320 (pose B). The matched feature corresponding to point $P_2$ is viewed by three images including first image 310 (pose A), second image 320 (pose B), and third image 330 (pose C). The matched feature corresponding to point $P_3$ is viewed by four images including first image 310 (pose A), second image 320 (pose B), third image 330 (pose C) and fourth image 340 (pose D).

The pose pairs for each matched feature can be identified as each set of two images that view the matched feature. Referring to FIG. 4, the matched feature corresponding to point $P_1$ is viewed by a single pose pair, namely pose pair AB (image 310 and image 320). The matched feature corresponding to point $P_2$ is viewed by three pose pairs, namely pose pair AB (image 310 and image 320), pose pair AC (image 310 and image 330), and pose pair BC (image 320 and image 330). The matched feature corresponding to point $P_3$ is viewed by six pose pairs, namely pose pair AB (image 310 and image 320), pose pair AC (image 310 and image 330), pose pair AD (image 310 and image 340), pose pair BC (image 320 and image 330), pose pair BD (image 320 and image 340), and pose pair CD (image 330 and image 340).

As discussed above, the graph model can be constructed in a manner that takes into account the number of images viewing each matched feature and the number of pose pairs viewing each matched feature. In particular, the graph model can have a source node and a sink node. The graph model can further include one or more point nodes. Each point node can represent a matched feature. The graph model can further include one or more pose pair nodes. Each pose pair node can represent a pose pair in the set of images. A plurality of edges can interconnect the various nodes of the graph model. Each edge can have a capacity and a cost determined according to exemplary aspects of the present disclosure.

Figure 5:
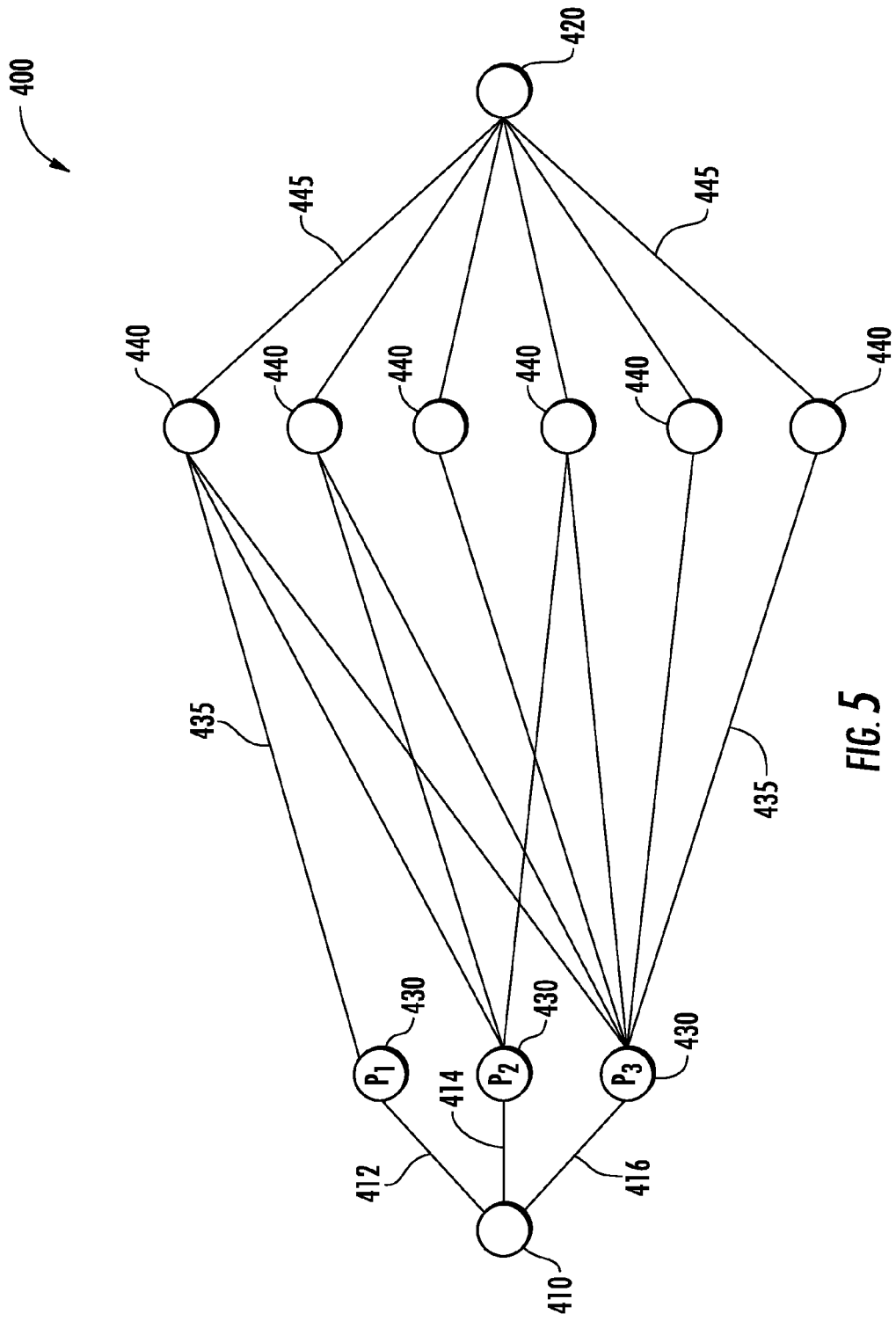
FIG. 5 depicts an exemplary graph model constructed according to an exemplary embodiment of the present disclosure.

FIG. 5 depicts an exemplary graph model 400 constructed in accordance with aspects of the present disclosure from the plurality of images 300 depicted in FIGS. 3 and 4. As illustrated in FIG. 5, the graph model 400 includes a source node 410 and a sink node 420. The graph model 400 also includes a plurality of point nodes 430. Each point node 430 represents a matched feature in the plurality of images. In particular, the point nodes 430 represent matched features corresponding to points $P_1$, $P_2$, and $P_3$ respectively.

The graph model 400 further includes a plurality of pose pair nodes 440. Each pose pair node 440 represents a pair of images in the plurality of images 300. In the example of FIG. 5, the graph model 400 includes a pose pair node 440 for each possible pose pair for the plurality of images 300 of FIGS. 3 and 4. In particular, the graph model includes a pose pair node 440 representing the AB pose pair, the AC pose pair, the AD pose pair, the BC pose pair, the BD pose pair, and the CD pose pair.

The graph model 400 includes a plurality of edges interconnecting the source node 410, the point nodes 430, the pose pair nodes 440, and the sink node 420. More particularly, the graph model 400 can include a plurality of source edges 412, 414, and 416 between the source node 410 and the point nodes 430, a plurality of point edges 435 between the point nodes 430 and the pose pair nodes 440, and a plurality of sink edges 445 between the pose pair nodes 440 and the sink node 420.

Each of the edges in the graph model 400 can have a capacity. In one exemplary implementation, the point edges 435 between the point nodes 430 and the pose pair nodes 440 can each have a capacity that is always equal to one. The sink edges 445 between the pose pair nodes 440 and the sink node 420 can have a capacity that is set to a desired maximum number of matched features viewed by a pose pair that can be selected as a constraint for adjusting camera parameters using bundle adjustment. For instance, in one implementation the sink edge 445 can have a capacity of 150 when a desired maximum number of matched features viewed by a pose pair is 150.

The sink edges 445 of the graph model 400 can all have the same capacity. Alternatively, the sink edges 445 can have different capacities, for instance, if a different number of matched per pose pair are desired. For instance, the capacities for the sink edges 445 can be different to accommodate different image sizes or different ground coverage by each image.

The source edges 412, 414, and 416 can have a capacity determined based on the number of pose pairs viewing the matched feature associated with the point node connected to the source edge. For instance, source edge 412 can have a capacity of 1 because 1 pose pair views the matched feature corresponding to point $P_1$. Source edge 414 can have a capacity of 3 because 3 pose pairs view the matched feature corresponding to point $P_2$. Source edge 416 can have a capacity of 6 because 6 pose pairs view the matched features corresponding to point $P_3$.

Each of the edges in the graph model 400 can also have a cost. The costs for each of the edges can be specified to prefer selection of matched features viewed by a higher number of pose pairs from different cameras. In one exemplary implementation, the point edges 435 between the point nodes 430 and the pose pair nodes 440 can have a cost determined based at least in part on the number of cameras associated with the pose pair node 440 connected to the point edge 435. For instance, if the images in the pose pair represented by the pose pair node 440 are captured from different cameras, the cost associated with the point edge 435 can be a first constant c1. Otherwise the cost associated with the point edge 435 can be a second constant c2. The second constant c2 can be greater than the first constant c1. For instance, the second constant c2 can be 2 and the first constant c1 can be 1. The sink edges 445 can have a cost equal to a third constant c3. The third constant c3 can be less than the first constant c1. For instance, the third constant c3 can be 0.

The cost for the source edges 412, 414, and 416 can determined based at least in part on the number of images viewing the matched feature associated with the point node connected to the source edge. In a particular implementation, the costs for the source edges 412, 414, and 416 are specified to prefer matched features viewed by more images. For instance, the cost for each of the source edges 412, 414, and 416 can be determined as follows:

$$\text{Cost}(n) = \text{ceil}[(n+1)/(n-1) * \text{cost}(n-1)]$$

where n is the number of images viewing the matched features associated with the point node connected to the source edge. The ceil { } operation rounds up to the nearest integer value.

Referring back to FIG. 2 at (210), a flow can be computed through each of the edges in the graph model. For instance, a flow can be computed for each of the source edges 412, 414, 416, point edges 435, and sink edges 445 in the graph model 400 of FIG. 5. According to an exemplary embodiment of the present disclosure, the flow is computed using a minimum-cost maximum-flow algorithm. For instance, a solution can be computed to minimize cost while maximizing the flow from the source node to the sink node through the graph model. The cost can be determined as follows:

$$C = \sum_i f_i c_i$$

where $f_i$ is the flow for edge i, and $c_i$ is the cost for edge i. Other suitable techniques can be used to compute flow through each of the plurality of edges without deviating from the scope of the present disclosure. For instance, linear programming techniques can be performed to compute the flow through the plurality of edges.

At (212) of FIG. 2, the method includes selecting matched features as constraints for parameter optimization based on the flow through the edges in the graph model. More particularly, a matched feature can be selected as constraints based on the flow associated with the source edge in the graph model connected to the point node representing the matched features. For example, referring to FIG. 5, the matched feature corresponding to point $P_1$ can be selected as a constraint based on the flow through source edge 412. The matched feature corresponding to point $P_2$ can be selected as a constraint based on the flow through source edge 414. The matched feature corresponding to point $P_3$ can be selected as a constraint based on the flow through source edge 416.

In one implementation, the matched features can be selected as constraints based on the flow associated with the source edge by comparing the flow of the source edge to a threshold. The threshold can be set to any suitable value. The matched feature represented by the point node connected to the source edge can be selected as constraint when the flow of the source edge exceeds a threshold. Otherwise, the matched feature is not selected for use as a constraint during parameter optimization. In another implementation, the matched features can be selected as constraints based on the flow associated with the source edge by comparing the ratio of the flow to the cost for the source edge to a threshold.

Referring to the example graph model of FIG. 5, the flow through the source edge 412 can be computed using a minimum-cost maximum-flow algorithm as 0. The flow through the source edge 414 can be computed using a minimum-cost maximum-flow algorithm as 2. The flow through the source edge 416 can computed using a minimum-cost maximum-flow algorithm as 6. For purposes of illustration and discussion, the threshold can be set to 1. Based on this threshold, the matched features corresponding to points $P_2$ and $P_3$ can be selected as constraints for use in bundle adjustment. The matched feature corresponding to point $P_1$ is not selected as a constraint.

Referring to (214) of FIG. 2, the method includes adjusting at least one camera parameter using the selected matched features as constraints. The at least one camera can be adjusted using parameter optimization, such as a non-linear optimization technique. In one exemplary embodiment, a matched feature between images selected as constraints can be modeled as a spring that connects the poses of the images. The parameter optimization can adjust the poses of each of the images such that the total pull on each image is balanced.

Once the camera parameter has been adjusted according to aspects of the present disclosure, the two-dimensional images can be used to generate interactive geographic imagery for presentation to a user. For example, the two-dimensional images can be used to construct a three-dimensional model of a geographic area. As another example, the two-dimensional images can be used to construct interactive panoramas of a geographic area.

Exemplary Computing Environment for Adjusting a Camera Parameter

Figure 6:
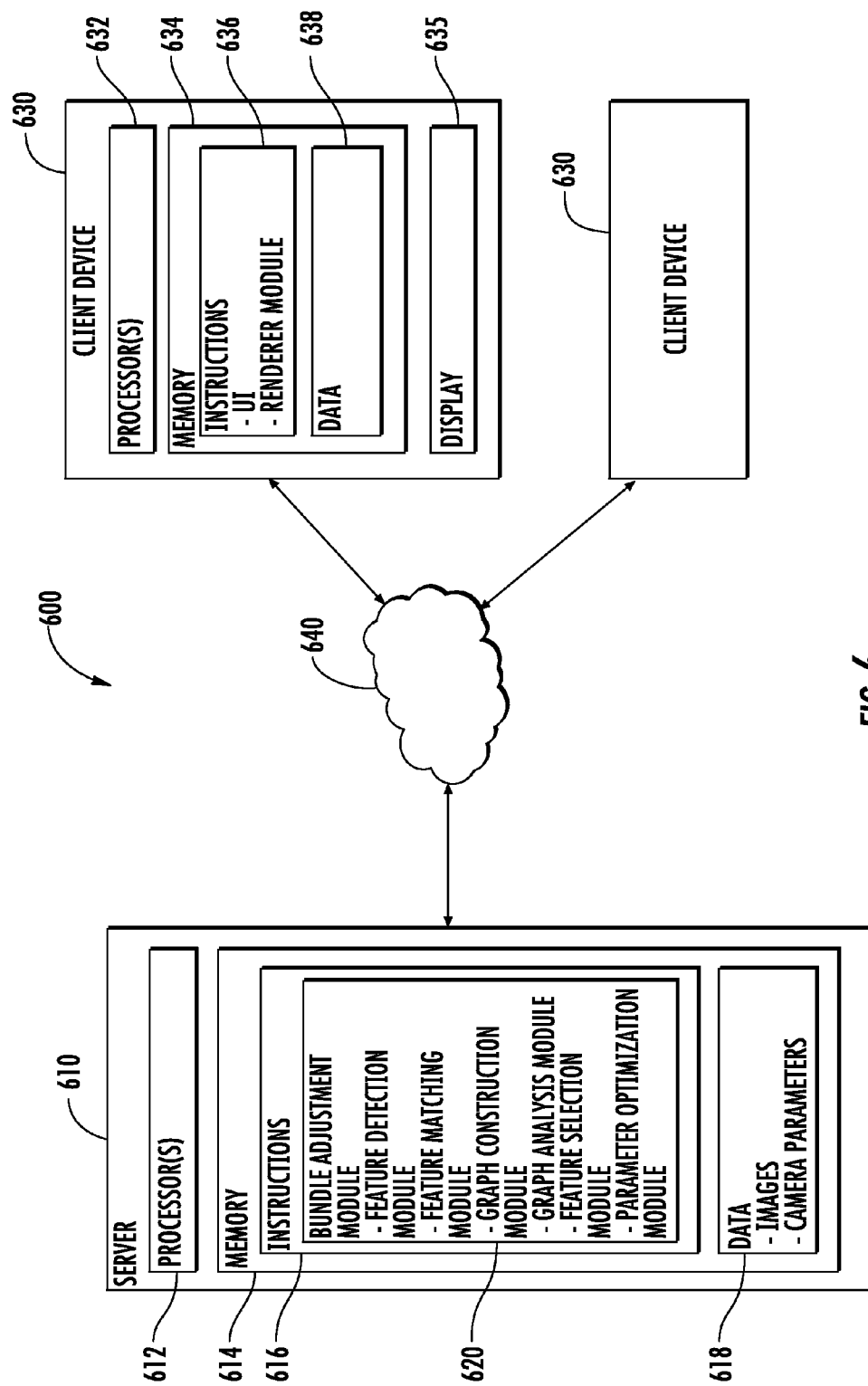
FIG. 6 depicts an exemplary computing system for adjusting a camera parameter associated with a plurality of images according to an exemplary embodiment of the present disclosure.

FIG. 6 depicts an exemplary computing system 600 that can be used to implement the methods and systems for adjusting a camera parameter associated with a plurality of images according to exemplary aspects of the present disclosure. The system 600 is implemented using a client-server architecture that includes a server 610 that communicates with one or more client devices 630 over a network 640. The system 600 can be implemented using other suitable architectures, such as a single computing device.

The system 600 includes a server 610, such as a web server. The server 610 can be implemented using any suitable computing device(s). The server 610 can have a processor(s) 612 and a memory 614. The server 610 can also include a network interface used to communicate with one or more client devices 630 over a network 640. The network interface can include any suitable components for interfacing with one more networks, including for example, transmitters, receivers, ports, controllers, antennas, or other suitable components.

The processor(s) 612 can be any suitable processing device, such as a microprocessor, microcontroller, integrated circuit, or other suitable processing device. The memory 614 can include any suitable computer-readable medium or media, including, but not limited to, non-transitory computer-readable media, RAM, ROM, hard drives, flash drives, or other memory devices. The memory 614 can store information accessible by processor(s) 612, including instructions 616 that can be executed by processor(s) 612. The instructions 616 can be any set of instructions that when executed by the processor(s) 612, cause the processor(s) 612 to provide desired functionality. For instance, the instructions 616 can be executed by the processor(s) 612 to implement a bundle adjustment module 620 and other modules.

The bundle adjustment module 620 can be configured to adjust a camera parameter associated with a plurality of images according to exemplary aspects of the present disclosure, such as implementing the method disclosed in FIG. 2. Referring back to FIG. 6, the bundle adjustment module 620 can implement a feature detection module, a feature matching module, a graph construction module, a graph analysis module, a feature selection module and a parameter optimization module.

The feature detection module can be configured to identify a plurality of features in the plurality of images. The feature matching module can be configured to match one or more of the identified features as matched features. The graph construction module can be configured to construct a graph model based on the matched features. For instance, the graph construction module can construct a graph model based at least in part on the number of pose pairs viewing the matched feature and the number of images viewing the matched feature. In a particular implementation, the graph construction module is configured to construct a graph model that favors selection of matched features viewed by multiple pose pairs and from different cameras as criteria for bundle adjustment. The graph analysis module can be configured to analyze the graph model to compute a flow through the plurality of edges in the graph model. For instance, the graph analysis module can implement a minimum-cost maximum flow algorithm to determine a flow through the plurality of edges in the graph model. The feature selection module can be configured to select one or more matched features as constraints for adjusting camera parameters based at least in part on the flow computed for the plurality of edges in the graph model. The parameter optimization module can be configured to adjust the camera parameters based on the constraints using, for instance, non-linear optimization.

It will be appreciated that the term "module" refers to computer logic utilized to provide desired functionality. Thus, a module can be implemented in hardware, application specific circuits, firmware and/or software controlling a general purpose processor. In one embodiment, the modules are program code files stored on the storage device, loaded into memory and executed by a processor or can be provided from computer program products, for example computer executable instructions, that are stored in a tangible computer-readable storage medium such as RAM, hard disk or optical or magnetic media.

Memory 614 can also include data 618 that can be retrieved, manipulated, created, or stored by processor(s) 612. The data 618 can include images of a geographic area and/or one or more camera parameters associated with the images. The data 618 can be stored in one or more databases. The one or more databases can be connected to the server 610 by a high bandwidth LAN or WAN, or can also be connected to server 610 through network 640. The one or more databases can be split up so that they are located in multiple locales.

The server 610 can exchange data with one or more client devices 630 over the network 640. Although two client devices 630 are illustrated in FIG. 6, any number of client devices 630 can be connected to the server 610 over the network 640. The client devices 630 can be any suitable type of computing device, such as a general purpose computer, special purpose computer, laptop, desktop, mobile device, smartphone, tablet, wearable computing device, or other suitable computing device.

Similar the computing device 610, a client device 630 can include a processor(s) 632 and a memory 634. The processor(s) 632 can include one or more central processing units, graphics processing units dedicated to efficiently rendering images, and or other processing devices. The memory 634 can store information accessible by processor(s) 632, including instructions 636 that can be executed by processor(s) 632 and data 638. For instance, the memory 634 can store instructions 636 for implementing a user interface module and a renderer module for presenting interactive imagery of a geographic area to a user.

The client device 630 can include various input/output devices for providing and receiving information from a user, such as a touch screen, touch pad, data entry keys, speakers, and/or a microphone suitable for voice recognition. For instance, the computing device 630 can have a display 635 for presenting imagery of a geographic area to a user.

The client device 630 can also include a network interface used to communicate with one or more remote computing devices (e.g. server 610) over the network 640. The network interface can include any suitable components for interfacing with one more networks, including for example, transmitters, receivers, ports, controllers, antennas, or other suitable components.

The network 640 can be any type of communications network, such as a local area network (e.g. intranet), wide area network (e.g. Internet), or some combination thereof. The network 640 can also include a direct connection between a client device 630 and the server 610. In general, communication between the server 610 and a client device 630 can be carried via network interface using any type of wired and/or wireless connection, using a variety of communication protocols (e.g. TCP/IP, HTTP, SMTP, FTP), encodings or formats (e.g. HTML, XML), and/or protection schemes (e.g. VPN, secure HTTP, SSL).

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method for adjusting one or more camera parameters associated with a plurality of images, the method comprising:
   identifying, by one or more computing devices, a matched feature in the plurality of images, the matched feature associated with at least one pose pair, the at least one pose pair comprising two images of the plurality of images that depict the matched feature;
   constructing, by the one or more computing devices, a graph model based at least in part on the matched feature, the graph model comprising a plurality of nodes including a source node and a sink node, the graph model comprising a plurality of edges;
   computing, by the one or more computing devices, a flow through the plurality of edges in the graph model; and
   selecting, by the one or more computing devices, the matched feature as a constraint for adjusting the camera parameter based at least in part on the flow computed through the plurality of edges in the graph model;
   wherein selecting the matched feature as a constraint for adjusting the camera parameter based on the flow computed through the plurality of edges in the graph model comprises:
   comparing, by the one or more computing devices, the flow of a source edge in the graph model to a threshold; and
   selecting, by the one or more computing devices, the matched feature as a constraint when the flow exceeds the threshold.

2. The computer-implemented method of claim 1, wherein the graph model is constructed based at least in part on the number of pose pairs viewing the matched feature and the number of images viewing the matched feature.

3. The computer-implemented method of claim 1, wherein the flow is computed through the plurality of edges in the graph model using a minimum-cost maximum-flow algorithm.

4. The computer-implemented method of claim 1, wherein the graph model comprises:
   a point node representing the matched feature; and
   a pose pair node representing the at least one pose pair.

5. The computer-implemented method of claim 4, wherein the plurality of edges comprises:
   a source edge between the source node and the point node;
   a point edge between the point node and the pose pair node; and
   a sink edge between the pose pair node and the sink node.

6. The computer-implemented method of claim 5, wherein the source edge has a capacity determined based on the number of pose pairs that view the matched feature associated with the point node.

7. The compute implemented method of claim 5, wherein the point edge has a capacity of 1.

8. The computer-implemented method of claim 5, wherein the sink edge has a capacity determined based at least in part on a maximum number of matched features viewed by the pose pair to be selected as a constraint for adjusting the camera parameter.

9. The computer-implemented method of claim 5, wherein the source edge has a cost determined based at least in part on the number of images viewing the matched feature associated with the point node.

10. The computer-implemented method of claim 5, wherein the point edge has a cost determined based at least in part on the number of cameras associated with the pose pair.

11. The computer-implemented method of claim 5, wherein the sink edge has a cost of zero.

12. The computer-implemented method of claim 1, Wherein the method comprises adjusting, by the one or more computing devices, the camera parameter based on the constraint.

13. The computer-implemented method of claim 1, wherein adjusting, by the one or more computing devices, the camera parameter comprises a non-linear optimization.

14. The computer-implemented method of claim 1, wherein the camera parameter comprises a pose of at least one of the plurality of images.

15. A computing system for adjusting a camera parameter associated with a plurality of images, the computing system comprising:
   one or more processors;
   one or more computer-readable media;
   a feature matching module implemented by the one or more processors, the feature detection module configured to identify a matched feature in the plurality of images, the matched feature associated with at least one pose pair, the at least one pose pair comprising two images of the plurality of images that depict the matched feature;
   a graph construction module implemented by the one or more processors, the graph construction module configured to construct a graph model based at least in part on the number of pose pairs viewing the matched feature and the number of images viewing the matched feature;
   a graph analysis module implemented by the one or more processors, the graph analysis module configured to compute a flow through the plurality of edges in the graph model using a minimum-cost maximum-flow algorithm; and
   a feature selection module implemented by the one or more processors, the feature selection module configured to select the matched feature as a constraint based at least in part on the flow computed through the plurality of edges in the graph model;
   wherein the feature selection module is configured to compare the flow of a source edge in the graph model to a threshold; and to select the matched feature as a constraint when the flow exceeds the threshold.

16. The computing system of claim 15, wherein the system further comprises a parameter optimization module implemented by the one or more processors, the parameter optimization module configured to adjust the camera parameter based on the constraint using non-linear optimization.

17. One or more tangible, non-transitory computer-readable media, the one or more tangible, non-transitory computer-readable media storing instructions that when executed by one or more processors cause the one or more processors to perform operations, the operations comprising;
    identifying a matched feature in the plurality of images, the matched feature associated with at least one pose pair, the at least one pose pair comprising two images of the plurality of images that depict the matched feature;
    constructing a graph model based at least in part on the matched feature, the graph model comprising a plurality of nodes including a source node and a sink node, the graph model comprising a plurality of edges;
    computing a flow through the plurality of edges in the graph model; and
    selecting the matched feature as a constraint for adjusting the camera parameter based at least in part on the flow computed through the plurality of edges in the graph model,
    wherein the graph model comprises a point node representing the matched feature and a pose pair node representing at least one pose pair, wherein the plurality of edges comprises a source edge between the source node and the point node, a point edge between the point node and the pose pair node, and a sink edge between the pose pair node and the sink node;
    wherein the source edge has a capacity determined based on the number of pose pairs that view the matched feature associated with the point node.

* * * * *